3,214,297
METHOD OF MAKING ACTIVE MASS FOR POSITIVE ELECTRODES FOR ALKALINE ACCUMULATORS

Lutz Horn, Hagen, and Fritz Philipp and Siegfried Dickfeldt, Hagen-Haspe, Westphalia, and Rolf Dieberg, Bonn, Germany, assignors to Accumulatoren-Fabrik Aktiengesellschaft, Hagen, Westphalia, Germany
No Drawing. Filed Dec. 11, 1961, Ser. No. 158,562
Claims priority, application Germany, Dec. 16, 1960, A 36,298
6 Claims. (Cl. 136—29)

This invention relates to a method of manufacturing positive active material for alkaline storage batteries, and particularly to improvements in the manufacture of active material comprising largely nickel-hydrate or hydrated nickel oxide and a conductive material, with or without an anti-polar mass additive.

Heretofore such active materials have been used with a mixture of conductive material consisting of finely divided graphite, or nickel or cobalt in the form of flakes or powder. Electrochemical utilization of the active material energy has heretofore been limited to only approximately 60% to 80% of the theoretical capacity. This relatively inefficient utilization of the theoretical capacity is largely due to imperfect blending and bonding together of the heterogeneous component particles. This has the effect of reducing conductivity for two reasons, viz:

(1) Not every small particle of the nickel hydroxide or other active material is in contact with the conductive material of the electrodes, and (2) Inadequate mechanical contact has been made even with those particles of active material which do contact the conductive material, thus causing resistance losses.

It is an object of our invention to provide a novel method of manufacturing positive active material which will avoid the aforementioned disadvantages and produce active material having capacity substantially equal to the full theoretical capacity.

A further and particular object of our invention is to provide an improved method for producing positive active material comprising a heterogeneous blend of finely divided conductive material and one or more active materials in granulated form selected from the group consisting of nickel-hydroxide, hydrated nickel-oxide, and cobalt-hydroxide, which will deliver approximately the theoretically maximum output of electro-chemical energy.

A further object is to provide a method of producing positive active material of the class described containing an anti-polar additive in the form of negative active material whereby the several constituents are so blended and bonded together that the anti-polar additive and active materials will not separate during the charge of the electrodes carrying the resulting active mass, and whereby the anti-polar additive is rendered fully effective at cell reversal.

These objects are achieved by the following procedural steps:

(a) The finely divided conductive material is thoroughly blended with one or more active materials in granulated form selected from the group consisting of nickel hydroxide, hydrated nickel-oxide, cobalt hydroxide, cadmium and cadmium-hydroxide to form a heterogeneous mixture of active material and conductive material.

(b) This mixture is pelletized and formed into compressed pellets of relatively coarse granulated material.

(c) The pellets are mixed, preferably in a slowly turning mixing drum, and (d) The thoroughly mixed pelletized material is crushed and sized to separate undersize particles and to produce a finished active material consisting of granules of sizes within a predetermined range, e.g., from 60 microns to 1 millimeter.

Best results in the initial blending will be obtained with nickel-hydroxide or hydrated nickel-oxide particles of grain sizes within the range 10–100 microns and wherein the particle size of the conductive material is less than 10 microns. Graphite has been proven to be especially effective as conductive material of such grain sizes. Our method of manufacture has the advantage that the resulting specific surfaces of both the conductive material and of the active material have been substantially enlarged compared with those of similar known materials.

Moreover, our invention includes the discovery of the most effective relationship between specific surfaces of the conductive material and those of the nickel hydrate or similar positive active material required to make possible the utilization of substantially all of the theoretical electrochemical output of the active material. Thorough blending of the active material and conductive material mixture is extremely important if satisfactory efficiency is to be obtained. To this end a high speed blender of the type known as a pin mill will bring best results. It is possible to adjust the mixing rate by selecting the number of revolutions of the rotating blades and also by governing the arrangement and diameter of the pins.

Details of our novel method will be understood from the following example. As the first step in the procedure 1.6 kg. of nickel-hydroxide which has been ground and air elutriated with a grain size of 12 to 80 microns and specific surfaces of 3000 cm.$^2$ per gram was thoroughly mixed for three minutes with 0.4 kg. of graphite of 6 micron grain size and specific surfaces of 50,000 cm.$^2$ per gram in a high speed blender. The resulting mixture was blended in a pin mill operating at 14,000 to 18,000 r.p.m. The mixture thus obtained will perform satisfactorily as active material due to its very fine texture. However, the use of this product in pocket plates is rather critical since high density is required in order to avoid short circuits caused by graphite which has separated out. Moreover, the theoretical efficiency has not yet been attained with this product.

To obviate these disadvantages, the blended powder was worked over in a tight friction mill with a gap width of 0.5 to 0.1 millimeter in order to assure optimum contact between the active material and the graphite, to form layers of active material as thin as possible, and to closely control the porosity of the final product. The powder is thus formed into coarse granules or pellets. This as a rule can be achieved by repeating the rolling process 10 to 15 times. The coefficient or angle of friction can be adjusted as needed by controlling the velocity of the rolls and should be between 1–1.1 and 1–1.3 for this pelletizing operation.

As the next step, the coarsely granulated material was mixed for 15 minutes in a slowly turning mixing drum. Finally, the mixed, pelletized material was crushed and sized. For this purpose the material was passed through a granulator having a strainer with a mesh size of approximately 1 millimeter. About 14% to 16% of very fine dust was produced by this crushing and sizing treatment. The dust and particles of sizes smaller than 60 microns were then separated from the granulated, coarser material by air elutriation and was returned, after careful analysis, for use as a part of the material incorporated in the next batch which was prepared according to our invention. The somewhat coarser material with granules of 60 microns to 1 millimeter which remained in the elutriator constituted the finished active material. From 96% to 100% of the theoretical capacity of this material was found to be utilizable at the 10 hour discharge rate.

To avoid the evolution of hydrogen at the positive plate when individually sealed cells of the battery series are reversed, hermetically sealed alkaline storage batteries often require the addition of anti-polar material such as cadmium, cadmium-oxide or cadmium-hydroxide in the mixture with positive active material. Heretofore malfuctioning of such batteries has frequently been caused by a separation of materials of opposite polarity during the charging of the batteries. Such separation has been obviated by our invention. For example, when prepared in accordance with our method a blend consisting of 80% nickel-hydroxide ($Ni(OH)_2$) and 20% cadimum-hydroxide ($Cd(OH)_2$) in the grain sizes hereinbefore specified was found to be fully effective at cell reversal, and the cells delivered substantially their full theoretical output.

We claim:

1. A method of manufacturing positive active material for alkaline batteries which comprises:
    (a) blending particles of active material, being at least one member selected from the group consisting of nickle hydroxide and hydrated nickle oxide, having a grain size within the range of 10 to 100 microns with particles of graphite in the form of flakes or powder having a grain size of less than 10 microns in a suitable mixing apparatus, then
    (b) homogenizing said product in a pinned disk mill by slowly rotating at a range of 14,000 to 18,000 r.p.m. to form a uniform mixture.
    (c) pelletizing said homogenized mixture in the dry state by rolling in a friction roller mill until all of the homogenized mixture is in a form of coarse pellets, then
    (d) crushing said homogenized coarse material to yield a finely granulated material,
    (e) classifying the grandulated material, and
    (f) removing the fine dust of less than 60 micron size from said finely granulated material, and retaining the part of said finely granulated material of particle size greater than 60 microns as said positive active material.

2. A method in accordance with claim 1 in which the material blended in step (a) comprises particles of graphite and granulated active material in proportions by weight of 16 parts of active material to 4 parts of graphite.

3. A method in accordance with claim 1 in which the sizing of the relatively coarse mixture to separate undersize particles is performed by air elutriation.

4. A method in accordance with claim 1 in which the pelletizing of the mixture in accordance with step (c) thereof is characterized by the use of friction rollers with a gap less than 0.5 mm. and a coefficient of friction from 1–1.1 to 1–1.3.

5. A batch method in accordance with claim 1 in which the sizing of the finished material includes air elutriation to separate particles of sizes smaller than 60 microns from one batch and incorporating the separated finer material from said batch as a component of the positive active material of the blend formed in a subsequent batch.

6. A method in accordance with claim 1 wherein the active material blended in accordance with step (a) comprises approximately 80% nickel-hydroxide including graphite and 20% cadmium hydroxide by weight in particles of sizes within the range 10–100 microns.

References Cited by the Examiner

UNITED STATES PATENTS

| | | | |
|---|---|---|---|
| 2,406,345 | 8/46 | Brennan | 175—315 |
| 2,700,062 | 1/55 | Schlecht | 136—29 |
| 2,832,813 | 4/58 | Peters | 136—24 |
| 2,934,581 | 4/60 | Dassler | 136—9 |
| 3,009,979 | 11/61 | Coren et al. | 136—24 |
| 3,009,980 | 11/61 | Corren et al. | 136—24 |
| 3,024,296 | 3/62 | Adler | 136—24 |
| 3,108,910 | 10/63 | Herold | 136—29 |

WINSTON A. DOUGLAS, *Primary Examiner.*

JOHN H. MACK, MURRAY TILLMAN, *Examiners.*